June 16, 1942.  W. A. GORDON  2,286,405
METHOD OF AND MEANS FOR TREATING RUBBER
Filed Dec. 8, 1938   3 Sheets-Sheet 1
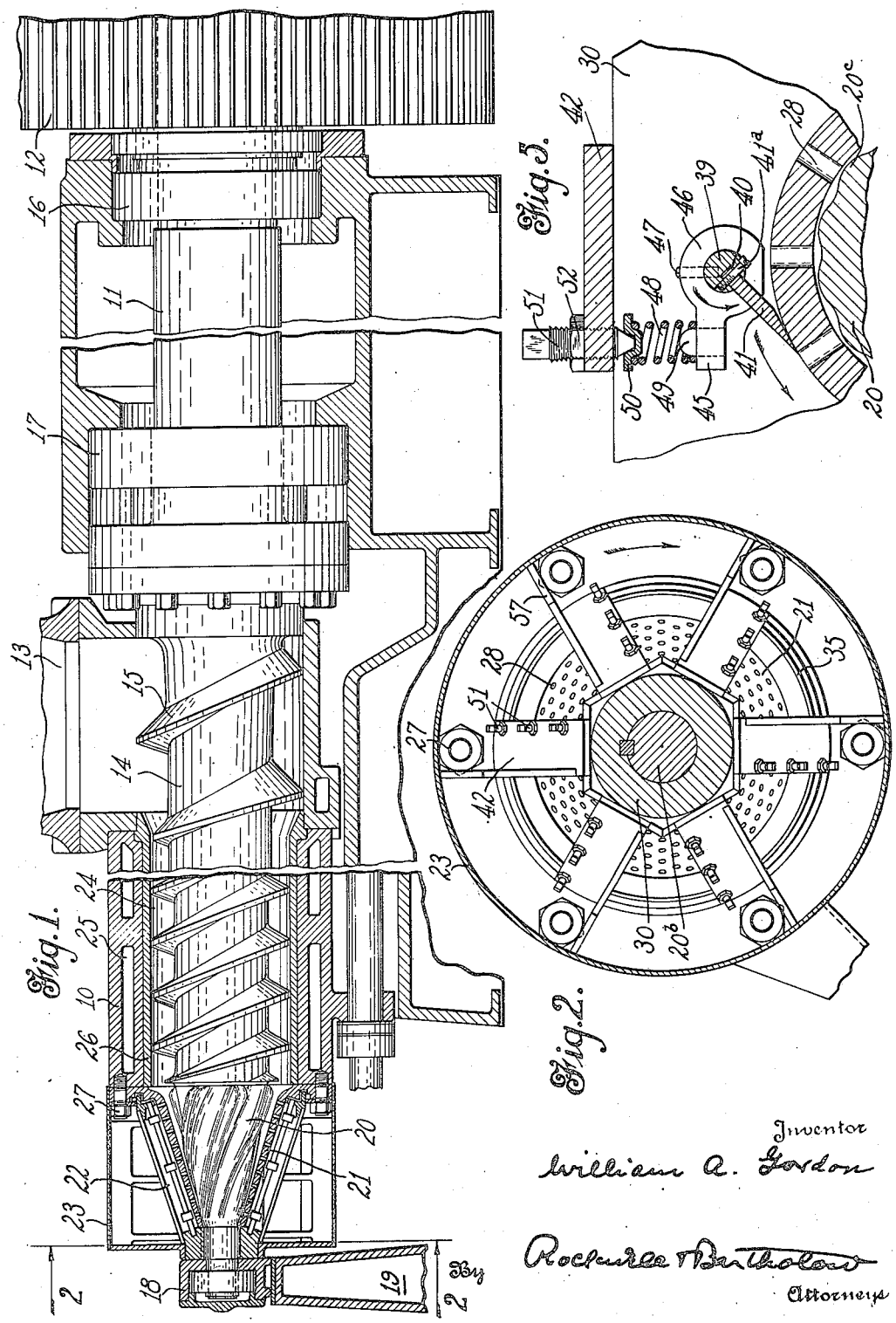

June 16, 1942. W. A. GORDON 2,286,405
METHOD OF AND MEANS FOR TREATING RUBBER
Filed Dec. 8, 1938 3 Sheets-Sheet 2

SPRAY NOZZLES FOR LIQUID

Inventor
William A. Gordon,
By Rockwell Bartholow
Attorneys

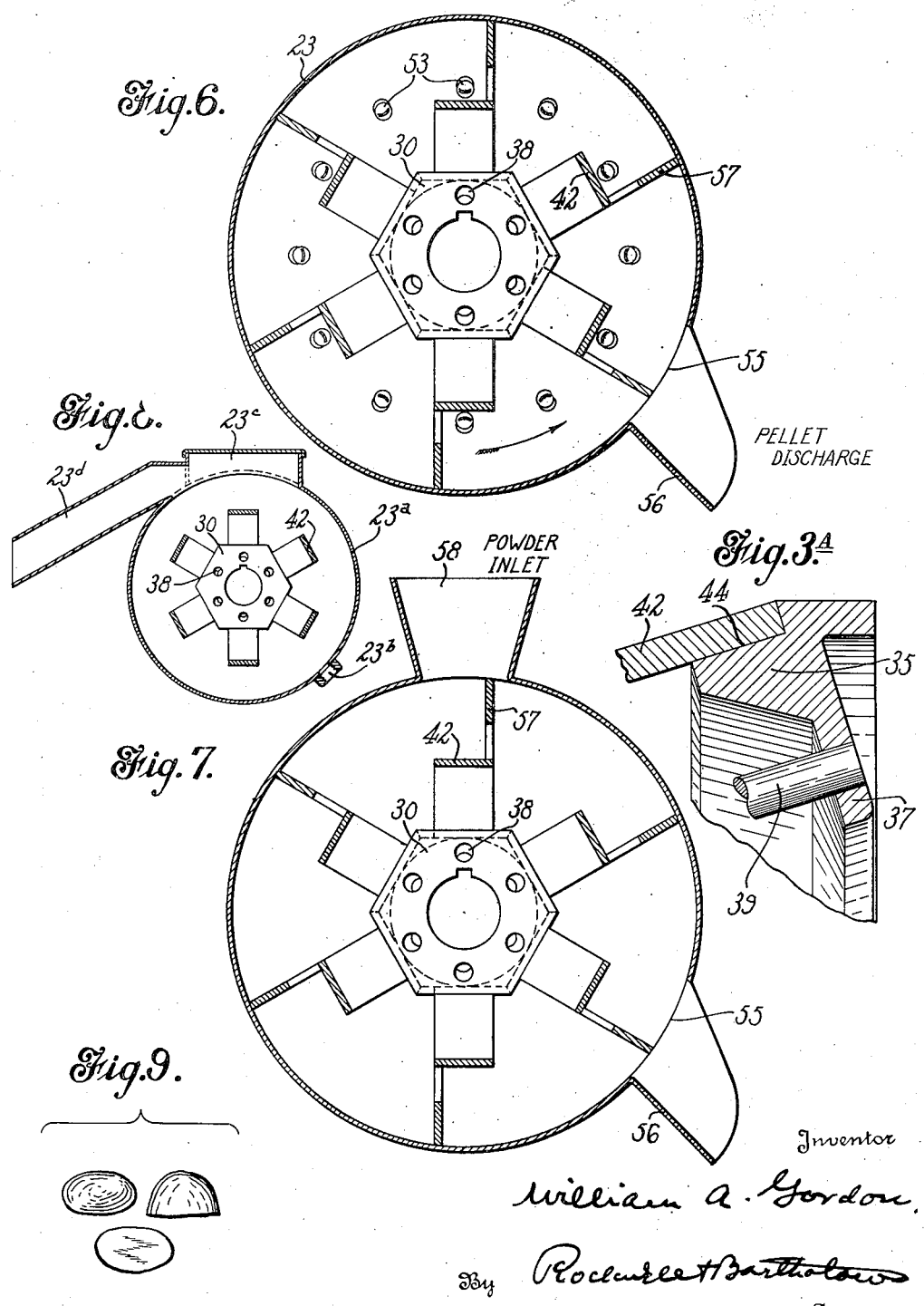

Patented June 16, 1942

2,286,405

UNITED STATES PATENT OFFICE 2,286,405

METHOD OF AND MEANS FOR TREATING RUBBER

William A. Gordon, Shelton, Conn., assignor to Farrel-Birmingham Company, Inc., Ansonia, Conn., a corporation of Connecticut Application December 8, 1938, Serial No. 244,609

13 Claims. (Cl. 18—12)

This invention relates to methods of and means for treating rubber.

In making vehicle tires and other rubber articles the rubber, with other ingredients, is compounded in suitable mills or mixers. Usually before the rubber reaches the mill or mixer, it is broken down so that it will mix more readily with the compounding substances. Usually the rubber, after being broken down and while in the form of a rough sheet or slab, is carried to the compounding machine, into which it is introduced either in the original form or in the form of large chunks or pieces. Owing to the form in which the broken-down rubber is handled, there is considerable inconvenience and increased labor cost, and also other drawbacks.

One of the objects of my invention is to provide a machine which not only breaks down the crude rubber in a satisfactory way, but also converts it into a form or condition in which it can be handled in subsequent operations more expeditiously and conveniently than heretofore.

Another object is to provide a plasticizing machine of the general type of my previously known "Plasticator," constructed and arranged so as to discharge or deliver the broken-down rubber in such form that it can be readily measured as to weight, etc., for subsequent mixing or other operations, and in particular to construct the machine in such a manner that the rubber before discharge is transformed into small pellets or bullet-like pieces which can be handled or stored in a mass without sticking together.

Another object is to provide a new method of treating rubber, and particularly crude rubber, and also a new product in the form of pellets or nodules of broken-down rubber, as hereinafter more particularly described.

In the accompanying drawings:

Fig. 1 is a longitudinal vertical section partly broken away of a machine embodying my invention;

Fig. 2 is an enlarged section on line 2—2 of Fig. 1;

Fig. 3A is a detail showing on a larger scale certain parts illustrated in Fig. 3;

Fig. 5 is an enlarged section on line 5—5 of Fig. 3;

Fig. 6 is a transverse section through the pellet-receiving and discharging casing looking toward the discharge end of the machine, the rotor being omitted;

Fig. 7 is a view similar to Fig. 6, showing a somewhat modified form of the machine;

Fig. 8 is a somewhat diagrammatic sectional view showing a further modified form; and Fig. 9 comprises top, side and bottom views of one of the pellets discharged by the machine, this view being about twice actual size.

Figure 3:
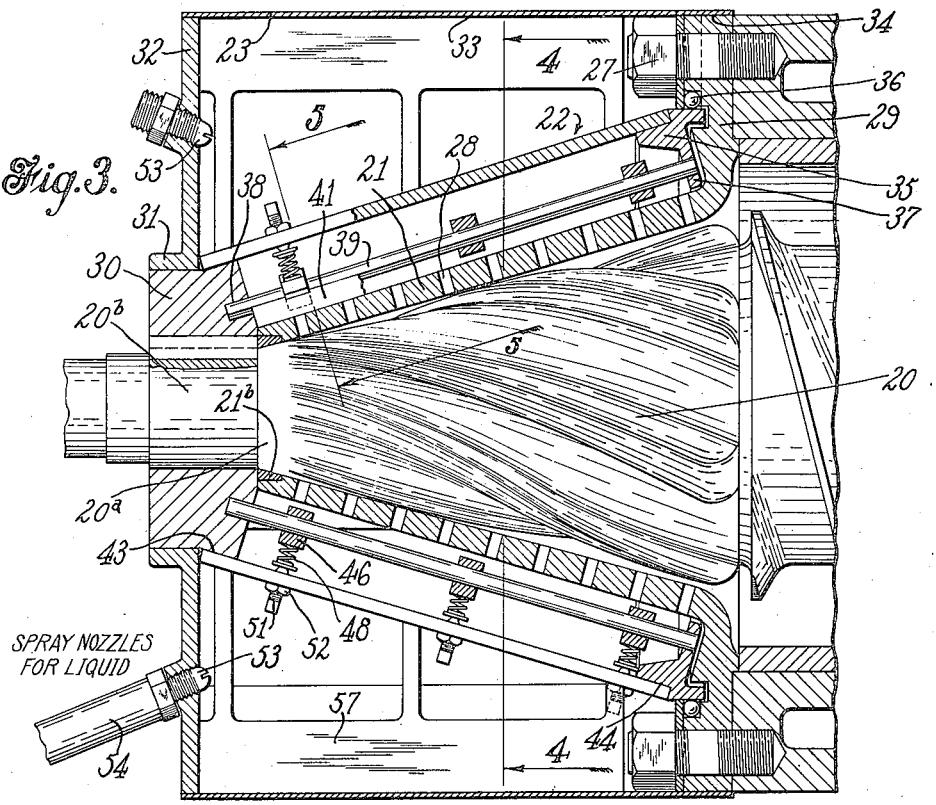
Fig. 3 is an enlarged view of certain parts shown in Fig. 1, these parts being at the discharge end of the machine.
Figure 4:
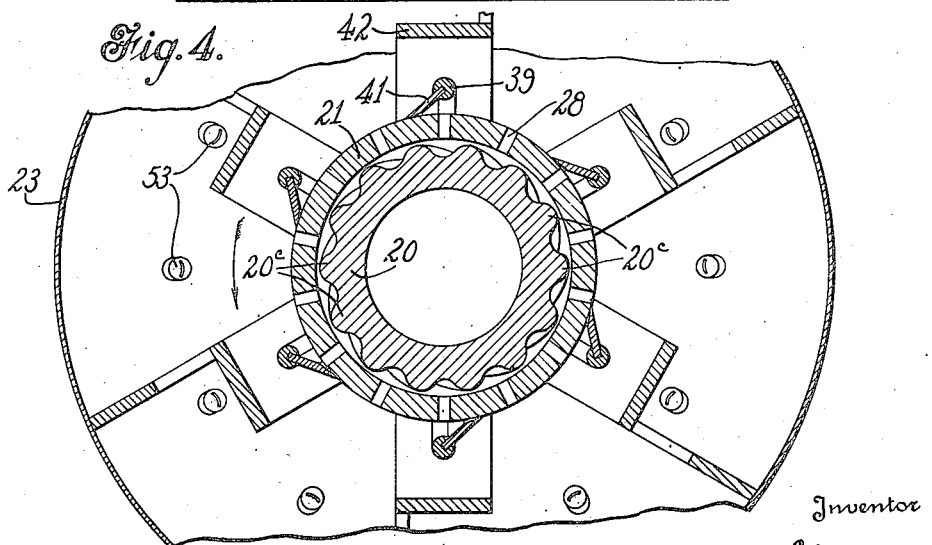
Fig. 4 is a section on line 4—4 of Fig. 3.

In its general features the machine selected for illustration and description comprises a casing provided with a feed hopper into which the bales of crude rubber are introduced, said casing being provided with a long shaft driven at one end from suitable gearing, and having through a considerable portion of its length a rotor provided with a feeding and working blade in the nature of a screw, which impinges on the rubber fed into the hopper, forces it through the casing longitudinally, and discharges it in the form of broken-down plastic rubber at the end of the casing. For the purpose of reducing the discharged rubber into small pieces, there is provided adjacent the discharge end of the machine a suitable perforated member through which the rubber is forced by the plasticizing blade or screw, and, in association with this member or screen, a revolving knife mechanism which, as the rubber issues from the small openings or perforations, cuts it into small pieces. These small pieces, after their formation, and preferably while still in the machine, are suitably treated to cool them and to render their surfaces non-tacky, so that upon discharge from the machine they are ready for further handling, such as travel in a suitable conveyor, weighing, etc., before being used for such operations as compounding.

In the drawings the casing of the machine is indicated generally at 10, the long shaft 11, the large gear at one end at 12, the hopper or receiving chamber, which is intermediate of the ends of the shaft, at 13, the rotor at 14, and the feeding and working screw at 15. In the casing, shaft 11 has suitable bearings, such as shown at 16 and 17, and at the discharge end of the machine is an outboard bearing 18 for the reduced extremity of the shaft, which bearing is at the upper end of a suitable pedestal 19. In between the outboard bearing 18 and the discharging end of blade or screw 15, the rotor is provided with a rubber discharging portion 20 shown as a conical portion surrounded by a perforated shell or screen 21, around which revolves a knife structure or frame 22, this latter with the shell 21 being disposed within a casing 23 located between the cylindrical part of the main casing and the outboard bearing.

Referring now to the details of the apparatus, it will be observed that the cylindrical portion 24 of the casing, which constitutes the main working chamber in which mastication and breaking down of the rubber take place, is water-jacketed, as shown at 25, and provided with a suitable lining member 26. To the end of the cylinder the perforate member 21 is attached, preferably by means of bolts 27 screwing into the end of the cylinder, as best shown in Fig. 3. The member 21 is formed of a tapering shell or hollow cone provided over its body with a multiplicity of small openings or perforations 28, preferably round and of a diameter of the order of three-eighths inch. At its larger end the cone is flared and provided with a lateral flange 29 through which the bolts 27 pass for holding the shell to the casing. The tapering wall of the shell is close to the conical portion 20 of the rotor and the opposing surfaces of the two members converge toward the discharge end. The smaller end of member 21, disposed toward the end of the rotor, is located in close proximity to a smooth conical end portion 20$^a$ of the portion 20, as shown in Fig. 3, and in that location has a hardened annular insert 21$^b$ making contact with portion 20$^a$ to prevent leakage of rubber. Adjacent portion 20$^a$ the rotor shaft has a cylindrical portion 20$^b$ on which is keyed or otherwise fixed a hub member 30 rotated by the shaft and serving to revolve the knife frame or structure 22, previously mentioned. The casing 23 previously mentioned has an open journal portion 31 in which the hub 30 is mounted for rotation, this journal portion being associated with the end wall 32 of casing 23. The casing is also provided with a side wall 33, which is rigidly supported from the working cylinder in any suitable manner, as by being welded at 34 to the edge of the screen flange 29.

The member 20 is provided with a plurality of flutes 20$^c$ which project from the surface thereof toward the screen and act to force the rubber through the screen. These flutes are arranged at an angle to the axis of the rotor so that they have a longitudinal as well as a radial forcing action.

In the embodiment shown, the knife frame is adapted to mount a plurality of longitudinally disposed knives making contact with the exterior of the perforated shell at different points in its circumference, this knife structure being mounted at one end on the hub 30 so as to be driven thereby, and being suitably supported at the other end. For this purpose a ring member 35 is rotatably mounted in association with flange 29 at the exterior of the shell and flange 29 is preferably provided with a suitable anti-friction bearing for said ring, as indicated at 36. The ring 35 is provided with an inwardly extending flange 37. Extending between and mounted in round openings in this flange 37 and round sockets 38 in hub 30 are rods 39. These rods 39 are provided with longitudinal grooves 40 (Fig. 5) in which are rigidly fixed knife blades 41, the latter being held by screws 41$^a$. These knives are beveled at their edges and arranged approximately tangentially to the surface of the perforated cone, so that as the knife frame is rotated material issuing from the perforations 28 of the cone will be cut off.

The knife blades 41 are resiliently urged against the surface of the screen, and preferably suitable springs are interposed between the knife blades and longitudinal members 42 of the knife frame. These longitudinal members 42 are preferably constituted by spacing bars arranged substantially parallel to and outwardly of the respective knife-carrying rods 39, and rigidly interconnecting hub 30 and ring 35. As shown in Fig. 3, one end of each bar 42 may be welded to hub 30 at 43, and the other end may be welded in a rabbet 44 of ring 35, as best shown in Fig. 3A.

The preferred construction involves the application to each knife rod 39 at longitudinally spaced points of arm members 45 having collars 46 embracing rod 39 and pinned thereto, as shown at 47. Between the arm projecting from collar 46 and the opposing surface of bar 42 is a compression spring 48 resting on a centering boss 49 on arm 45, and having socketed in it at its opposite end a washer 50 having a socket adapted to be engaged by the end of a set screw 51 adapted to be screwed in and out of bar 42 and adapted to be clamped in adjusted position by nut 52. In the particular case shown there are three adjustable spring devices of this kind acting on each longitudinal knife member, but the number may be varied as required by circumstances.

For the purpose of spraying with a suitable liquid material cut by the knives, suitable spray nozzles may be used in connection with casing 23, in the form of apparatus shown in Figs. 1 to 6, inclusive. Spray nozzles 53 are mounted at a number of points in the wall 32 of casing 23. Liquid is carried to these nozzles by tubes or pipes 54, such as shown in Fig. 3. I prefer to have the nozzles located approximately in ring formation, and to have them inclined relatively to the axis of the rotor so that the sprays issuing from them will converge, and so that the spray will be thrown around and distributed over the entire perforated surface of the shell. A sufficient number of nozzles are used, also, so that the knife-mounting members will not prevent a sufficient amount of liquid spray from reaching the material as and after it is cut by the knives.

For discharging the material from casing 23, a discharge opening 55 is provided, and associated with it may be a chute 56, as shown more particularly in Fig. 6. For moving the material around in the casing and passing it to the discharge, suitable means may be associated with the revolving knife structure so as to be moved thereby. For this purpose I prefer to mount from the bars 42 generally radial sweep members 57 suitably supported at their inner ends from the bars 42, and having their outer ends or edges working against the inner surface of the casing.

In the treatment of rubber in accordance with the invention the procedure is substantially as follows:

Crude rubber in the form of bales or chunks is introduced into chamber 13 and fed into and worked in the working cylinder, in which it is thoroughly masticated and rendered plastic. It is important to note that in this operation, in which a body of crude rubber is passed slowly through the cylinder in a longitudinal direction while being thoroughly worked around and against the inner surface of the cylinder, the rubber is broken down, the same no longer having its initial molecular structure. Crude rubber must be broken down or plasticized before it can be compounded and made into useful forms. As the rubber mass passes over the fluted discharge portion 20 it is further squeezed and rotated thereby, and issues in fine threads or strings from the perforations 28. The surface speed of the knives around the cone, and the number of knives, are such that very shortly after the rubber moves past the discharge end of a perforation it is cut off, and in this way pellets or nodules or bullet-like pieces, such as shown in Fig. 9, are formed and permitted to drop to the bottom of the casing. These pellets are somewhat irregular in shape, and those produced from the same machine will vary from each other slightly, but generally speaking they are of the form shown in Fig. 9. For one thing, they are apt to be of elliptical rather than round contour, and this I believe to be due to the lateral pressure exerted by the knives in cutting them off. Also it will be oberved that these pellets or nodules have generally flat bottoms due to their being cut off at this point by the knives, and as to their bodies, these in general are of dome-shaped conformation, as I have attempted to indicate in Fig. 9. The pellet shown here is about twice actual size, but of course I desire it to be understood that, while the pellets will always be rather small, I do not limit myself to any particular dimensions.

As the pellets are formed they come under the action of the sprays of liquid introduced into the casing by the nozzles 53. The liquid has two important functions—first, that of cooling the hot plastic rubber and thereby preserving the shape of the pellet or piece, and second, of rendering the surfaces of the pellets non-tacky so that they will not stick together in the chamber 23 or elsewhere, but on the other hand will retain their separated condition. For the purpose of killing the tackiness of the pellets, the liquid may, for example, contain a certain amount of soap or clay. The sprays of liquid introduced into the casing by the nozzles will obviously provide within the confined space a body of dispersed tackiness-destroying material, such body in this case comprising fine drops of liquid which are thrown around and distributed over the entire perforated surface of the shell. However, as hereinafter appears, I may use dry instead of liquid material for destroying the tackiness of the pellet surfaces.

As the pellets are dropped off into the casing, they are moved about therein by the sweeps 57, and when they reach the opening 55 they are discharged from the machine. They may, if desired, pass to a suitable conveyor, carrying them to suitable bins in which they may be stored. In this form the rubber can be very conveniently handled for compounding and other purposes. It is obvious that it can be weighed in a convenient manner, so that exactly the proper quantity can be incorporated in the batch of material being compounded. It is of great advantage that the rubber in each pellet is no longer crude rubber, but definitely has the characteristic of being broken down or pre-masticated. The result of this is that better results are obtained in the compounding machine, in which it is unnecessary to carry out the initial break-down of the rubber. Also the rubber can be much more conveniently handled in the factory in connection with all of the operations, of whatever nature, intermediate the plasticizing and the compounding. The interior of each pellet, being thoroughly plasticized, remains tacky for a considerable period of time.

In the modified form of apparatus shown in Fig. 7, I omit the spray nozzles and provide the casing about the knife structure with a hopper 58. This enables me to introduce a powder into the casing so that the same will cover the surfaces of the pellets and overcome their tackiness. In some cases treatment with a powdered material, such as talcum, is preferred. In this case there may, if desired, be a separate cooling step following the discharge of the pellets from the casing, the spray cooling within the casing being omitted. Where I use powdered material such as talcum for the purpose of killing the tackiness of the pellet surfaces, it will be obvious that the casing, which provides a confined space about the knives, permits a body of dusty tackiness-destroying material to be created, into which the pellets are projected as they are being formed. The formation of this body of fine material can be assisted by the rotation of the knives and sweeps in the casing, as well as the introduction of powder into the hopper on the casing. The provision of a body of a fine tackiness-destroying agent so as to cause the latter to come into contact with all parts of the pellet surface is of considerable importance in overcoming completely the surface tackiness of the pellets.

In the form shown in Fig. 8, the casing surrounding the screen and knives is filled with liquid, the knives preferably operating in a body of water containing a suitable substance such as soap or clay, which will overcome the tackiness of the pellets. Obviously also the liquid will cool the hot rubber. In this instance the casing 23$^a$ is provided at the lower part with an inlet 23$^b$ for the liquid, and at the top with a chamber 23$^c$, from which leads off a closed chute 23$^d$. It will be understood that in use of this apparatus the pellets are cut off while the rubber is submerged and float to the surface of the liquid in the chamber 23$^c$, and are then floated out through the chute 23$^d$. In order to accomplish this, the liquid is supplied continuously through the inlet to the casing, the supply being properly regulated to carry off and deliver the pieces as quickly as they are produced. After delivery from the chute the pieces are subjected to a drying operation.

The dome shape imparted to the body of the particle, as previously mentioned, is ascribed by me to the fact that when the rubber is forced out of the perforations it adheres somewhat to the edge of the latter, while moving more rapidly at the center, so as to partake of a mushrooming effect.

While I have described a few examples of my new method and treating means, I wish to have it understood that the invention is susceptible of many different embodiments and many different modifications, and that various changes in the procedure and in the constructional forms are considered to be within the scope of the claims.

What I claim is:

1. In a machine such as described, in combination with a rotor and a cone-shaped screen and a hub on the rotor adjacent the small end of the screen, a ring mounted to revolve around the screen adjacent its larger end, bars interconnecting said hub member and said ring, rockably mounted knives having mounting rods extending between the hub member and ring inwardly of said bars, and compression springs reacting against said bars and adapted to exert pressure on said knives to hold them in close contact with the screen.

2. A rubber-treating machine comprising a chamber, a rotor therein extending out of the chamber at one end, masticating means on said rotor within said chamber, a plurality of knives rotated by the rotor outside of the last-named end of the chamber, a perforate shell over which said knives operate, means on the rotor for forcing the masticated rubber peripherally from said shell through its perforations, a casing enclosing the shell and knives and adapted to hold fine particles of tackiness-destroying material, and means for supplying fine particles of such material to said casing.

3. A rubber-treating apparatus comprising a chamber having a rotor by which the mass of rubber is pushed toward one end of the chamber, a shell adjacent the last-named end of the chamber having a multiplicity of peripheral perforations, means on the rotor for forcing the rubber peripherally from said shell by way of said perforations, a closed casing into which the emerging rubber passes from said shell, said casing being adapted to hold tackiness-destroying material, means in said casing for cutting into small pieces the rubber strings emerging from the shell as they are being subjected to the action of said material, and means for discharging the treated pieces from said casing.

4. A rubber-treating apparatus comprising a chamber having a rotor by which the mass of rubber is pushed toward one end of the chamber, a shell adjacent the last-named end of the chamber having a multiplicity of peripheral perforations, means on the rotor for forcing the rubber peripherally from said shell by way of said perforations, a closed casing into which the emerging rubber passes from said shell, said casing being adapted to hold tackiness-destroying material, means in said casing for cutting into small pieces the rubber strings emerging from the shell, and means for spraying tackiness-destroying material into said casing.

5. In a rubber-treating machine, a rotor portion, a surrounding shell having a multiplicity of perforations, means for forcing rubber out of said perforations, a casing enclosing the shell into which the emerging rubber enters and in which it can be subjected to the action of a tackiness-destroying medium, means for supplying fine particles of such medium to said casing, cutting means in said casing for cutting off the rubber, and sweep means which moves the cut-off pieces over the inner surface of the casing toward a discharge point.

6. In a rubber-treating machine, a perforate shell through which the rubber is forced, a surrounding rotary cage, and a plurality of angularly shiftable spring-pressed knives carried by the cage and yieldingly contacting the outer surface of the shell.

7. In a rubber-treating machine, a rotor portion, a surrounding shell having a multiplicity of perforations, means for forcing rubber out of said perforations, a casing fully enclosing the shell into which the emerging rubber enters, cutting means in said casing for cutting off the rubber, and means for spraying tackiness-destroying material into the casing.

8. In a machine such as described, a rubber-discharging and cutting apparatus comprising a shell having a multiplicity of perforations, a rotor portion within the shell carrying a hub adjacent one end of the shell, a ring mounted to revolve around the shell adjacent its other end, bars interconnecting said hub member and said ring, and rockably mounted knives extending between the hub member and ring inwardly of said bars and yieldingly pressed against the outer surface of the shell.

9. In a rubber treating machine, a rotor portion, a surrounding shell having a multiplicity of peripheral perforations, means on said rotor portion for driving rubber radially outward through said perforations, a hub carried by said rotor portion exteriorly of said shell, a cage driven from said hub and extending about said shell and carrying knives sweeping over the external surface of the shell where perforated, a casing extending completely around said shell and said knives and into which the rubber emerges from the shell and having a lower portion into which drop the rubber pieces cut off by said knives, said casing providing a confined treating space for the rubber and having provisions for the discharge of the pieces, and means for introducing tackiness-destroying medium into the interior of said casing.

10. In a rubber treating machine, a rotor portion, a surrounding shell having a multiplicity of peripheral perforations, means on the rotor portion for forcing the rubber out of said perforations, a casing enclosing the shell throughout the periphery of the latter and providing a confined space into which the rubber emerging from the perforations enters and in which it can be subjected to the action of a tackiness-destroying medium, cutting means in said casing for cutting off the rubber, and means for supplying a tackiness-destroying medium to the interior of said casing.

11. The method of treating rubber which comprises forcing the rubber through peripheral perforations in a suitable shell, cutting off the rubber as it emerges from the perforations so as to form pellet-like pieces which drop off from the shell, providing a confined space in which the pieces are cut and to the lower boundary of which they drop and within which the are moved for purposes of discharge, and spraying a tackiness-destroying medium into said confined space, the rubber while moving in said space being subjected to said medium to render its external surfaces non-adhesive.

12. A rubber treating apparatus comprising a chamber having a rotor by which a mass of rubber is pushed substantially horizontally toward one end of the chamber, a shell adjacent the last-named end of the chamber having a multiplicity of peripheral perforations, means on the rotor for forcing the rubber out of said perforations, a casing into which the emerging rubber passes from said shell, said casing enclosing said shell substantially throughout the periphery of the latter and being mounted at one end from the wall of said chamber and provided at the opposite end with an end wall having an opening within which a portion of the rotor rotates, said casing being adapted to hold a body of tackiness-destroying material and having provisions for collecting and then discharging small pieces of rubber which are dropped from the shell and subjected to the action of said material, and means in said casing driven from the rotor shaft for cutting the rubber strings into such pieces.

13. In a rubber treating machine, a horizontally disposed shell having a multiplicity of peripheral perforations, a rotor portion within said shell having an end portion extending beyond the shell and supported by an outboard bearing, a hub on the end portion, a cage driven from said hub and extending about said shell, a plurality of knives carried by the cage and arranged to sweep over the external surface of the shell to cut the emerging rubber strings into small pieces, means providing a closed chamber extending about and enclosing the knives and shell, said means providing a space in which the cut-off pieces drop by gravity and also providing for the collection and discharge of the pieces, and means for introducing tackiness-destroying material in fine particles into said chamber.

WILLIAM A. GORDON.